(12) United States Patent
Gardner et al.

(10) Patent No.: US 8,341,626 B1
(45) Date of Patent: Dec. 25, 2012

(54) MIGRATION OF A VIRTUAL MACHINE IN RESPONSE TO REGIONAL ENVIRONMENT EFFECTS

(75) Inventors: Robert D. Gardner, Fort Collins, CO (US); Bret A. McKee, Fort Collins, CO (US); Brian J. Watson, Chesapeake, VA (US); Chris D. Hyser, Victor, NY (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 920 days.

(21) Appl. No.: 12/240,611

(22) Filed: Sep. 29, 2008

Related U.S. Application Data

(60) Provisional application No. 61/004,869, filed on Nov. 30, 2007.

(51) Int. Cl.
*G06F 9/00* (2006.01)

(52) U.S. Cl. .......................................... 718/1

(58) Field of Classification Search ....... 718/1; 717/148
See application file for complete search history.

(56) References Cited

U.S. PATENT DOCUMENTS

| | | | |
|---|---|---|---|
| 5,745,735 A | 4/1998 | Cohn | |
| 5,802,062 A | 9/1998 | Gehani | |
| 6,321,337 B1 | 11/2001 | Reshef | |
| 6,421,739 B1 | 7/2002 | Holiday | |
| 6,732,139 B1 | 5/2004 | Dillenberger et al. | |
| 6,901,522 B2 | 5/2005 | Buch | |
| 6,934,952 B2 | 8/2005 | Sarkar | |
| 6,944,699 B1 | 9/2005 | Bugnion | |
| 6,970,902 B1 | 11/2005 | Moon | |
| 6,985,951 B2 | 1/2006 | Kubala | |
| 7,089,558 B2 | 8/2006 | Baskey | |
| 7,127,625 B2 | 10/2006 | Farkas | |
| 7,174,381 B2 | 2/2007 | Gulko | |
| 7,203,944 B1 | 4/2007 | van Rietschote | |
| 7,480,908 B1 | 1/2009 | Tene | |
| 7,519,964 B1 | 4/2009 | Islam | |
| 7,856,549 B2 * | 12/2010 | Wheeler | 713/1 |
| 7,925,923 B1 * | 4/2011 | Hyser et al. | 714/13 |
| 2001/0034752 A1 | 10/2001 | Kremien | |
| 2002/0194389 A1 | 12/2002 | Worley | |
| 2004/0010787 A1 | 1/2004 | Traut | |
| 2004/0117539 A1 | 6/2004 | Bennett | |
| 2004/0186920 A1 | 9/2004 | Birdwell | |
| 2004/0193476 A1 | 9/2004 | Aerdts | |
| 2005/0039180 A1 | 2/2005 | Fultheim | |
| 2005/0060590 A1 | 3/2005 | Bradley et al. | |
| 2005/0149940 A1 | 7/2005 | Calinescu | |
| 2005/0166074 A1 | 7/2005 | Hack | |
| 2005/0166075 A1 | 7/2005 | Hack | |
| 2005/0246505 A1 | 11/2005 | McKenney | |
| 2005/0251802 A1 | 11/2005 | Bozek et al. | |
| 2005/0278722 A1 | 12/2005 | Armstrong | |
| 2006/0005189 A1 * | 1/2006 | Vega et al. | 718/1 |

(Continued)

OTHER PUBLICATIONS

Megow et al., "Stochastic Online Scheduling on Parallel Machines," Springer-Verlag Berlin Heidelberg, pp. 167-180, 2005.

(Continued)

*Primary Examiner* — Robert Fennema

(57) ABSTRACT

To place virtual machines on physical machines, at least one controller receives indicators related to regional environment effects. The at least one controller selects at least one of the virtual machines to migrate from one or more first physical machines to one or more second physical machines in response to the received indicators.

19 Claims, 4 Drawing Sheets

U.S. PATENT DOCUMENTS

| | | | |
|---|---|---|---|
| 2006/0023884 A1 | 2/2006 | McKee | |
| 2006/0041733 A1 | 2/2006 | Hyser | |
| 2006/0075067 A1 | 4/2006 | Blackmore | |
| 2006/0136913 A1 | 6/2006 | Sameske | |
| 2006/0149906 A1 | 7/2006 | Misra | |
| 2006/0195715 A1 | 8/2006 | Herington | |
| 2006/0200819 A1 | 9/2006 | Cherkasova | |
| 2006/0200820 A1 | 9/2006 | Cherkasova | |
| 2006/0200821 A1 | 9/2006 | Cherkasova | |
| 2006/0230407 A1 | 10/2006 | Rosu | |
| 2007/0043860 A1 | 2/2007 | Pabari | |
| 2007/0067435 A1 | 3/2007 | Landis | |
| 2007/0079307 A1 | 4/2007 | Dhawan | |
| 2007/0083642 A1 | 4/2007 | Diedrich | |
| 2007/0124474 A1 | 5/2007 | Margulis | |
| 2007/0171921 A1 | 7/2007 | Wookey et al. | |
| 2007/0180280 A1 | 8/2007 | Bolan | |
| 2007/0180436 A1* | 8/2007 | Travostino et al. | 717/138 |
| 2007/0180448 A1 | 8/2007 | Low et al. | |
| 2007/0180450 A1 | 8/2007 | Croft et al. | |
| 2007/0186212 A1 | 8/2007 | Mazzaferri et al. | |
| 2007/0260417 A1* | 11/2007 | Starmer et al. | 702/136 |
| 2008/0104587 A1 | 5/2008 | Magenheimer | |
| 2008/0104608 A1 | 5/2008 | Hyser | |
| 2009/0031307 A1* | 1/2009 | Chodroff et al. | 718/100 |
| 2009/0228726 A1* | 9/2009 | Malik et al. | 713/320 |
| 2010/0057529 A1* | 3/2010 | Boss et al. | 705/10 |

OTHER PUBLICATIONS

Hou et al., "A Genetic Algorithm for Multiprocessor Scheduling," IEEE Transactions on Parallel and Distributed Systems, vol. 5, No. 2, Feb. 1994.

YarKhan et al., "Experiments with Scheduling Using Simulated Annealing in a Grid Environment," Springer-Verlag Berlin Heidelberg, pp. 232-242, 2002.

U.S. Appl. No. 11/588,683, Non-Final Rejection dated Jun. 11, 2009, pp. 1-14 and attachments.

U.S. Appl. No. 11/588,683, Final Rejection dated Nov. 25, 2009, pp. 1-19 and attachments.

U.S. Appl. No. 11/588,683, Non-Final Rejection dated Jul. 13, 2010, pp. 1-20 and attachments.

U.S. Appl. No. 11/588,683, Examiner's Answer dated Aug. 3, 2011, pp. 1-24.

U.S. Appl. No. 11/588,691, Non-Final Rejection dated Oct. 14, 2010, pp. 1-15 and attachments.

U.S. Appl. No. 11/588,691, Final Rejection dated Mar. 31, 2011, pp. 1-18 and attachments.

U.S. Appl. No. 11/588,607, Non-Final Rejection dated Oct. 15, 2010, pp. 1-10 and attachments.

U.S. Appl. No. 11/588,607, Final Rejection dated Mar. 3, 2011, pp. 1-18 and attachments.

MVware Technology Network, "VMware VirtualCenter 1.2 Support Documentation," http://www.vmware.com/support/vc12/doc/c13migrationover.html, 16 pages (at least as early as Oct. 25, 2006).

Wikipedia definition of "Virtual machine," http://en.wikipedia.org/wiki/Virtual_machine, pp. 1-6 (at least as early as Sep. 6, 2006).

TheFreeDictionary definition of "Virtual Machine," http://computing-dictionary.thefreedictionaly.com/virtual%20machine, pp. 1-3 (at least as early as Sep. 6, 2006).

Wikipedia definition for "Hypervisor," http://en.wikipedia.org/wiki/Hypervisor, pp. 1-2 (at least as early as Sep. 6, 2006).

* cited by examiner

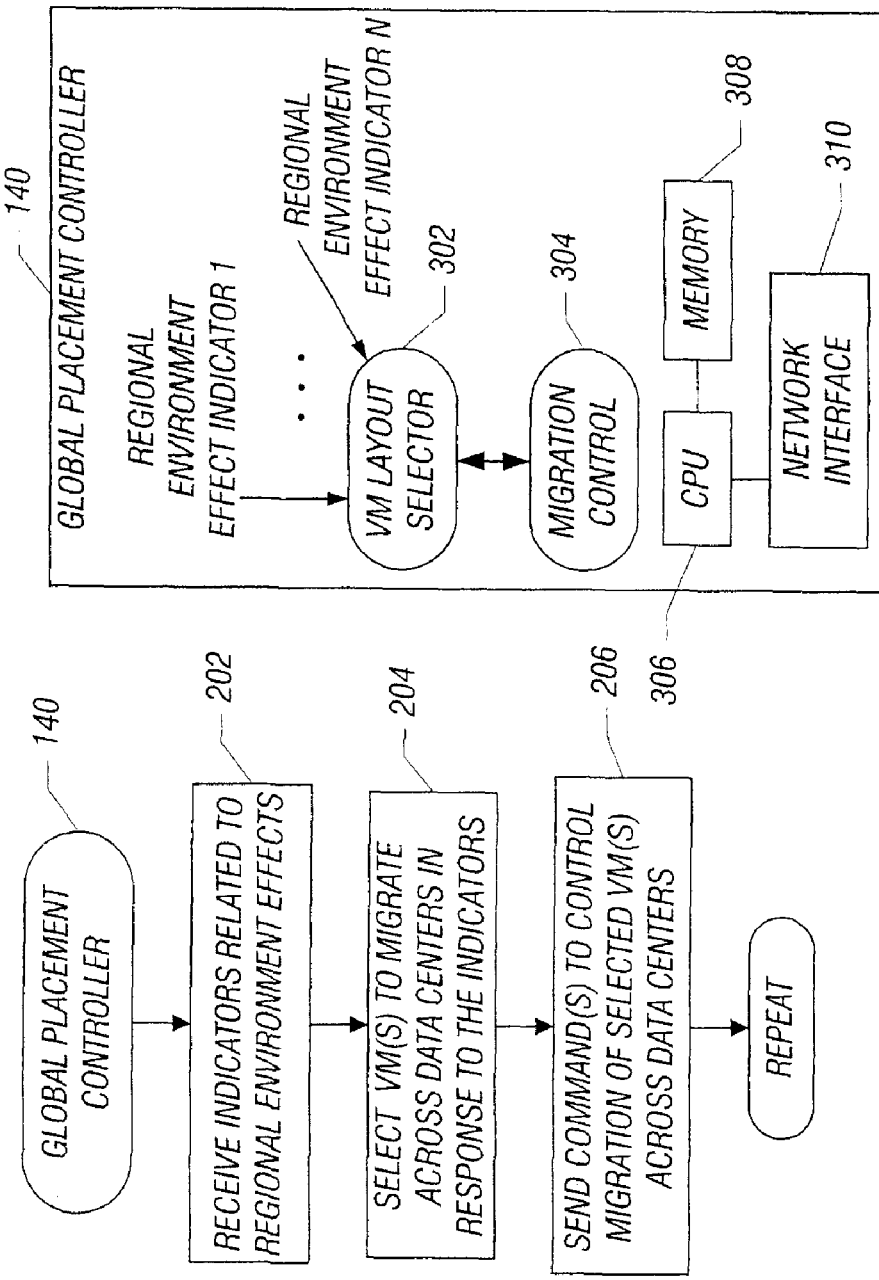

MIGRATION OF A VIRTUAL MACHINE IN RESPONSE TO REGIONAL ENVIRONMENT EFFECTS

CROSS REFERENCE TO RELATED APPLICATIONS

This Application claims the benefit of U.S. Provisional Application Ser. No. 61/004,869, filed Nov. 30, 2007, titled "Migration Of A Virtual Machine In Response To Regional Environment Effects"

BACKGROUND

Virtual machines can be provided in a computer to enhance flexibility and performance. A virtual machine typically refers to some arrangement of components (software and/or hardware) for virtualizing or emulating an actual computer, where the virtual machine can include an operating system and software applications. Virtual machines can allow different operating systems to be deployed on the same computer, such that applications written for different operating systems can be executed in different virtual machines (that contain corresponding operating systems) in the same computer. Moreover, the operating system of a virtual machine can be different from the host operating system that may be running on the computer on which the virtual machine is deployed.

In addition, a greater level of isolation is provided between or among applications running in different virtual machines. In some cases, virtual machines also allow multiple applications to more efficiently share common resources (processing resources, input/output or I/O resources, and storage resources) of the computer For enhanced performance, virtual machines can be provided on multiple computers that are interconnected by a network. When deploying virtual machines on multiple computers, a human administrator usually has to decide at virtual machine creation time on which physical machine the virtual machine should be deployed. Often, placement of virtual machines is typically performed manually by an administrator. Although some systems are able to provide some indication to the administrator that migrating a virtual machine from one computer to another computer would be desirable, the actual selection of which computer a virtual machine should be migrated to is performed manually by the human administrator. Such manual placement of virtual machines by a human administrator is typically a time-consuming process and often does not lead to optimal or even better placement of virtual machines.

Although some techniques have been proposed to automate the migration of virtual machines across physical machines in response to various conditions, it is noted that such automated migration techniques do not consider some factors that may be relevant to effective or efficient execution of virtual machines.

BRIEF DESCRIPTION OF THE DRAWINGS

Some embodiments of the invention are described, by way of example, with respect to the following figures:

FIG. 2 is a flow diagram of a process of controlling migration of virtual machines across physical machines in response to regional environment effects, in accordance with an embodiment;

FIG. 3 is a block diagram of the global placement controller of FIG. 1, in accordance with an embodiment;

DETAILED DESCRIPTION

Figure 1:
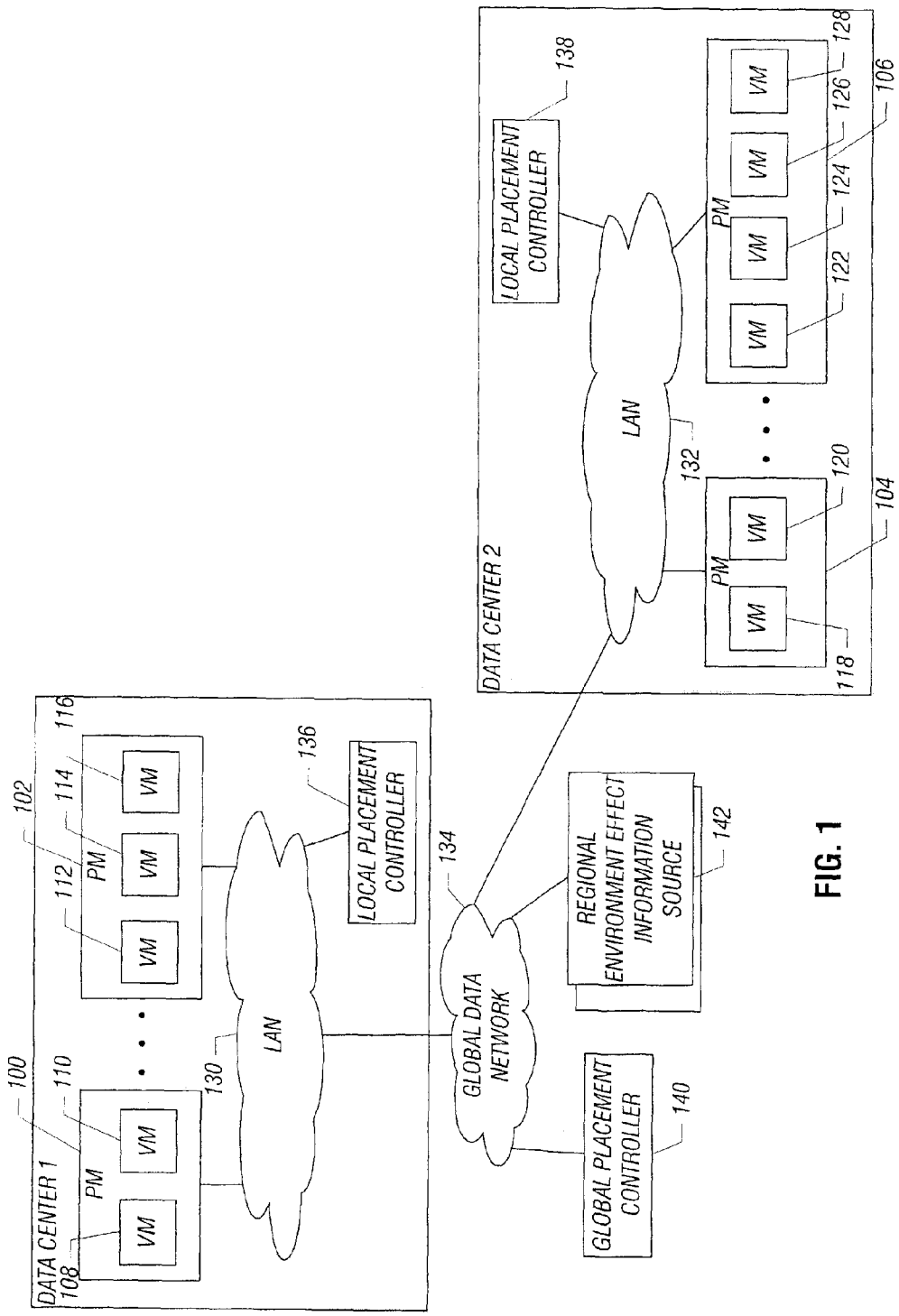
FIG. 1 is a block diagram of data centers including corresponding physical machines that contain virtual machines, and a global placement controller coupled to the data centers for controlling placement of virtual machines in accordance with an embodiment.

FIG. 1 illustrates an example arrangement that includes multiple data centers (data center 1 and data center 2 depicted in the example of FIG. 1), where each data center includes a corresponding arrangement of physical machines. For example, data center 1 includes physical machines 100, 102, and data center 2 includes physical machines 104, 106. Although just two physical machines are depicted in FIG. 1 for each data center, it is noted that each data center can include fewer physical machines or more physical machines.

A data center refers to some collection of computing resources, whether geographically concentrated or dispersed, that are able to cooperate to provide computing tasks for one or more clients. In one example, data centers 1 and 2 depicted in FIG. 1 can be located in different geographic regions, such as in different cities, states, countries, etc. Examples of data centers include application server farms, storage server farms, web server farms, switch or router farms, or any other collection of computing resources.

Each physical machine includes one or more virtual machines. In the example of FIG. 1, physical machine 100 includes virtual machines 108, 110; physical machine 102 includes virtual machines 112, 114, 116; physical machine 104 includes virtual machines 118, 120; and physical machine 106 includes virtual machines 122, 124, 126, and 128.

A physical machine can be located within one cabinet (or rack), or alternatively, the physical machine can be located in multiple cabinets (or racks). The physical machines in each data center are interconnected by respective local networks (network 130 in data center 1 and network 132 in data center 2). In the example of FIG. 1, the networks 130 and 132 are depicted as being local area networks, although other types of networks can be used in other implementations. Each network 130, 132 can also include a system bus or any other fast interconnect.

The data centers are interconnected by a global data network 134, which can be the Internet, a wide area network, or any other type of network. The term "network" is intended to refer to either a single network or some collection of multiple networks.

Examples of physical machines include computers, communications modules (e.g., switches, routers, etc.), and other types of machines. A physical machine indicates that the machine is an actual machine made up of software and hardware. Although each of the physical machines is depicted as being contained within a box, it is noted that a physical machine can be a distributed machine having multiple nodes that provide a distributed and parallel processing system.

A virtual machine refers to some partition or segment (made up of software and/or hardware) of the physical machine that is provided to virtualize or emulate a physical machine. From the perspective of a user, a virtual machine looks just like a physical machine. According to some embodiments, a virtual machine includes one or more software applications, an operating system, and one or more device drivers (which are typically part of the operating system).

It is noted that the operating systems that are part of corresponding virtual machines within a physical machine can be different types of operating systems or different versions of an operating system. This allows software applications designed for different operating systems to execute on the same physical machine.

The virtual machines within a physical machine are designed to share the physical resources of the physical machine. In the physical machine, these physical resources include the hardware of the physical machine, where the hardware can include one or more central processing units (CPUs), memory (volatile memory and/or persistent storage, such as disk-based storage), a network interface, and other resources (such as a storage area network interface, not shown).

As further depicted in the example of FIG. 1, each data center includes a corresponding local placement controller 136, 138. Each local placement controller 136, 138 provides automated management of the placement of virtual machines across physical machines of the respective data center. Management of placement of the virtual machines includes migrating virtual machines from source physical machines to destination physical machines.

Each local placement controller 136, 138 is able to determine an efficient placement of the virtual machines across physical machines based on predefined local criteria (according to a target policy set by an enterprise, a user, an administrator, etc.). The predefined local criteria according to the policy can include a target quality-of-service level to be provided, loading criteria (which specify some target loading level on a physical resource or machine), balancing criteria (which specify that load on physical machines should be balanced when possible), cooling criteria (which specify temperatures in physical machines that should not be exceeded), power criteria (which specify that power consumption should be reduced where possible), and other criteria. The loading criteria and balancing criteria are examples of distribution criteria in that such criteria tend to encourage distribution of virtual machines across a larger number of physical machines. On the other hand, the cooling criteria and power criteria are examples of consolidation criteria that tend to consolidate virtual machines onto fewer physical machines.

Each local placement controller 136, 138 is able to determine whether the current state of the overall corresponding data center (which includes the multiple physical machines) conforms to the policy. If the local placement controller determines that the state of the data center does not conform to the policy, then the local placement controller 136 can perform a re-evaluation to determine a different placement of virtual machines on physical machines to increase conformance to the policy.

If a different placement is determined by the local placement controller to be desirable, the local placement controller is able to perform migration of virtual machines from one physical machine to another physical machine within the data center. After placement of the virtual machines has been changed (by migration), the local placement controller can subsequently determine whether further migration should be performed. Note that workloads at the physical machines are continually changing. The local placement controller repeatedly checks (in a loop) whether the state of the data center conforms to policy. In effect, the local placement controller provides a feedback-driven mechanism to control the mapping of virtual machines onto physical machines. This feedback-driven mechanism allows automated adjustments of placement of the virtual machines on physical machines. By automating the virtual machine placement control, relatively quick response times can be achieved in changing placements of virtual machines in response to observed or predicted events that affect conformance with policy.

Migrating a virtual machine refers to moving the state of the virtual machine from one physical machine to another physical machine. The state of the virtual machine includes content of registers of various hardware devices (e.g., CPUs, I/O devices, and so forth). Data in memory associated with the migrated virtual machine can also be transferred gradually (e.g., lazily) to the destination physical machine to which the virtual machine is migrated. Control of the migration can be accomplished by using migration control software in the local placement controllers 136, 138, and/or by using migration control software in the physical machines.

The automated placement (initial and dynamic) of virtual machines on physical machines provided by the local placement controller 136, 138 according to some embodiments allows each data center to meet customer quality-of-service (QoS) goals and the data center's cost-of-service (CoS) goals on a given resource (made up of the physical machines in the system).

In addition to performing local placement of virtual machines on physical machines of a data center, the system of FIG. 1 also provides a global placement controller 140, which is coupled to the global data network 134, to allow for migration of virtual machines from one data center to another data center (or from first geographic region to a second geographic region remotely located from the first geographic region). A first geographic region is remotely located from, or separated from, a second geographic region if the first and second geographic regions are separated by some substantial distance (e.g., a city block, greater than one mile, a city limit, a state line, a country's border, etc.).

In performing placement of virtual machines, the global placement controller 140 takes into account regional environment effects, which include at least some of the following: availability of alternative power sources such as sunlight, hydroelectric power, wind power, etc.; availability of cool temperature; presence of inclement weather; presence of a natural disaster; presence of civil or military unrest; presence of a regional power outage; and so forth. Generally, the term "regional environment effect" refers to some condition that affects a relatively large geographic region or a relatively large group of physical machines. Such regional environment effects may indicate that executing virtual machines in some geographic regions or on some group of physical machines may not be efficient or effective. For example, availability of sunlight in some geographic regions may mean that an alternative, cheaper source of power is available in such geographic regions. Therefore, it may make sense to migrate virtual machines to physical machines in geographic regions where such alternative source of power is available. Cooling costs are also a concern when executing virtual machines in physical machines. Generally, sophisticated cooling equipment may be used to cool a large number of physical machines in a data center. Such sophisticated cooling equipment may consume relatively large amounts of power and thus, may be expensive to run. Therefore, migrating virtual machines to geographic regions that have cooler weather may reduce the load on cooling equipment, and thus reduce cooling costs. Also, physical machines in geographic regions where inclement weather, a natural disaster, civil or military unrest, and/or power outage have occurred may not be available. Therefore, it may be desirable to migrate virtual machines from such geographic regions to other geographic regions.

FIG. 1 thus depicts a multi-tiered virtual machine placement control system, where local placement controllers perform placement of virtual machines within a data center according to policies of the data center, and where the global placement controller 140 performs control of migration of virtual machines across different data centers (or different geographic regions) in response to regional environment effects. The global and local placement controllers can interact with each other to control placement of virtual machines in the overall system. More generally, the global placement controller is able to perform control of migration of virtual machines between or among different groups of physical machines in response to regional environment effects, where a "group" refers to either a data center or a geographic region. By using the multi-tiered placement control mechanism according to some embodiments, more effective automated placement of virtual machines can be accomplished to meet local policies of data centers, as well as to address issues associated with regional environment effects.

In a different embodiment, instead of using separate global and local placement controllers, it is noted that a single-tiered placement controller (or a single-tiered group of placement controllers) can be used to perform control of placement of virtual machines within the data center and across data centers (or geographic regions).

As further depicted in FIG. 1, multiple regional environment effect information sources 142 are coupled to the global data network 134. The regional environment effect information sources 142 are used to communicate indicators of corresponding regional environment effects to the global placement controller 140 across the global data network 134. Examples of regional environment effect information sources 142 include: news media sources; temperature sensors in various geographic regions; power systems indicating availability of alternative sources of power; systems to detect a relatively large region of power outages; weather forecast systems; and so forth. The regional environment effect information sources can also include computers or data entry terminals through which users or operators can enter information relating to regional environment effects.

FIG. 2 illustrates a procedure performed by the global placement controller 140 according to an embodiment. The global placement controller 140 receives (at 202) indicators related to regional environment effects, where the indicators are received from the regional environment effect information sources 142 depicted in FIG. 1. The indicators can be in the form of reports of predefined one or more formats, a stream of data, and so forth. Next, the global placement controller 140 selects (at 204) one or more virtual machines to migrate across data centers (or across geographic regions) in response to the indicators. The selection of the virtual machines to migrate to different data centers takes into consideration the combination of all of the regional environment effects that have been received by the global placement controller 140. Note that in some cases, some regional environment effects may indicate that virtual machines should be migrated to a first geographic region (or first data center), while a different regional environment effect would indicate that virtual machines should be migrated to a second geographic region (or second data center). For example, a geographic region having long, sunny days may also be relatively hot, particularly during summer months. Thus, even though there is ample availability of an alternative power source, in this example solar power, in such a geographic region, the load placed on cooling equipment if a large number of virtual machines were migrated to a data center located in such a hot geographic region may cause the cooling costs to exceed any benefit that would be derived from using solar power. Thus, the global placement controller 140 has to compare the benefits and costs associated with migrating virtual machines according to the different regional environment effects prior to selecting which virtual machines of which data centers (or geographic regions) to migrate to other data centers (or other geographic regions). For example, it may be the case that the global placement controller 140 can decide to leave virtual machines in a physical machine located in a cool geographic region (even though such a geographic region may not have good sunlight availability) due to the expected increase in costs associated with moving the virtual machines to another geographic region having a lot of sunlight, but in which the temperature is relatively elevated.

Next, the global placement controller 140 sends (at 206) command(s) to the appropriate entities to control migration of the selected virtual machine(s) across data centers. The appropriate entities can include local placement controllers 136, 138 and/or the physical machines that are involved.

The tasks of FIG. 2 may be provided in the context of information technology (IT) services offered by one organization to another organization. For example, the infrastructure (including the placement controllers, physical machines, and virtual machines of FIG. 1) may be owned by a first organization. The IT services may be offered as part of an IT services contract, for example.

FIG. 3 shows an example global placement controller 140 (which can be implemented as a computer), which includes a virtual machine (VM) layout selector 302 that receives as input various regional environment effect indicators (indicators 1 to N depicted, where N refers to the number of regional environment effects that are considered by the VM layout selector 302). The VM layout selector 302 selects virtual machines that are executing on physical machine(s) of a first group (e.g., first data center or first geographic region) for migration to physical machine(s) of a second group (e.g., second data center or second geographic region).

The global placement controller 140 also includes a migration control module 304 to control the migration of selected virtual machines (selected by the VM layout selector 302) between or among physical machines in different groups. The VM layout selector 302 and migration control module 304 are software modules executable on one or more central processing unit (CPUs) 306 in the global placement controller 140. The CPU(s) is (are) connected to memory 308 and to a network interface 310 to allow the global placement controller 140 to communicate over the global data network 134.

Figure 4:
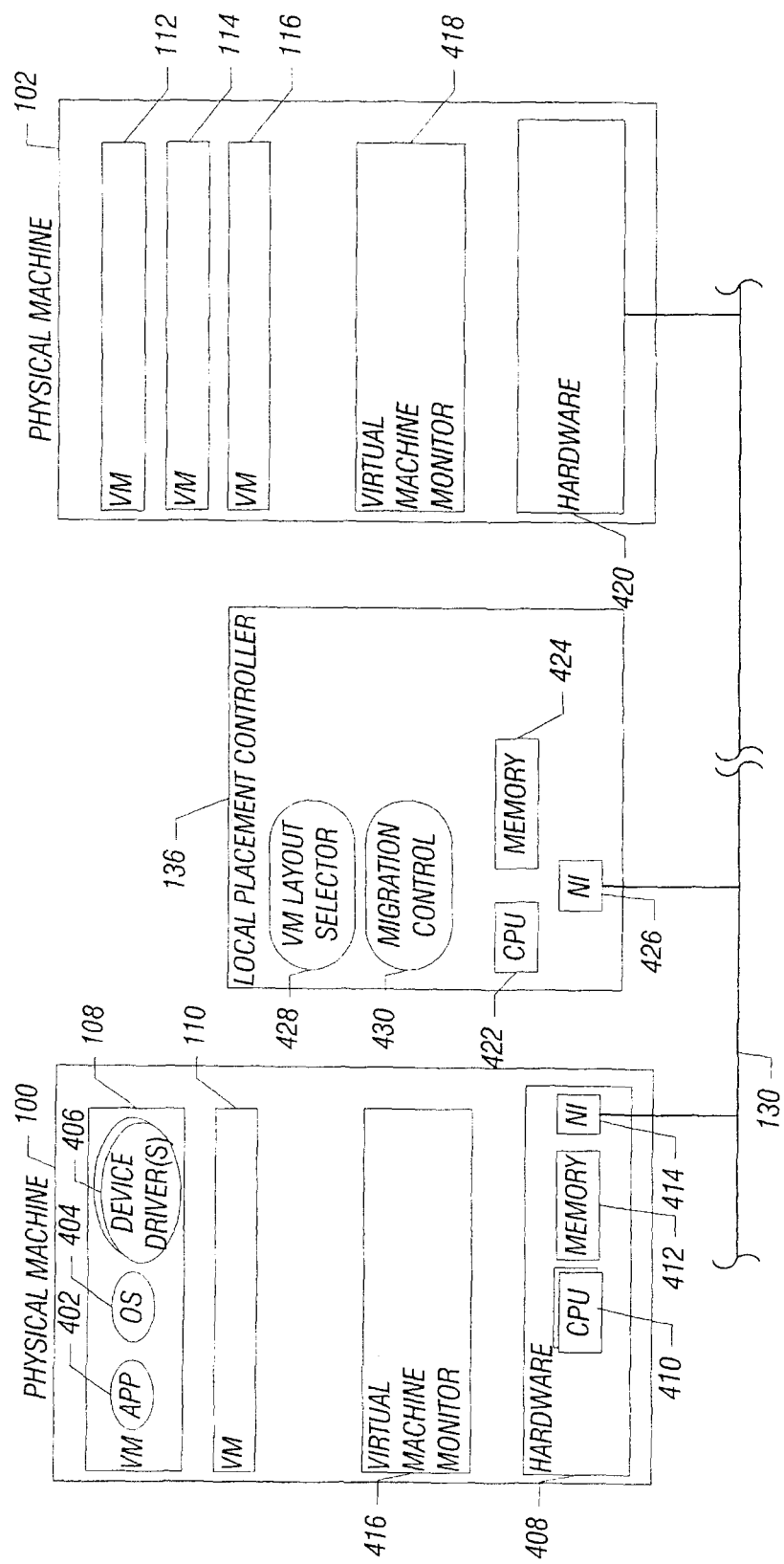
FIG. 4 is a block diagram of physical machines in a data center that also includes a local placement controller according to an embodiment.

FIG. 4 illustrates the physical machines 100 and 102 of data center 1 in FIG. 1, as well as the components of the local placement controller 136. Data center 2 has a similar arrangement of physical machines and placement controller.

As depicted in the example of FIG. 4, the virtual machine 108 in the physical machine 100 includes one or more software applications 402, an operating system 404, and device drivers 406 (that are usually part of the operating system 404). The virtual machine 110 similarly includes corresponding one or more software applications, operating system, and device drivers.

The virtual machines 108 and 110 in the physical machine 100 are designed to share physical resources, including hardware 408, which includes one or more CPUs 410, memory 412, a network interface 414, and other components. The network interface 414 allows each of the virtual machines 108 and 110 to communicate over the local network 130.

The physical machine 100 also includes a virtual machine monitor (VMM) 416, also called a hypervisor, which manages the sharing (by virtual machines 108, 110) of the physical resources, including the hardware 408, of the physical machine 100. The VMM 416 virtualizes the physical resources, including the hardware 408, of the physical machine 100. Also, the VMM 416 intercepts requests for resources from operating systems in the respective virtual machines 108, 110 so that proper allocation of the physical resources of the physical machine 100 can be performed. For example, the VMM 416 manages memory access, input/output (I/O) device access, and CPU scheduling for the virtual machines. Effectively, the VMM 416 provides an interface between the operating system of each virtual machine and the underlying hardware 408 of the physical machine 100. The interface provided by the VMM 416 to an operating system of a virtual machine is designed to emulate the interface provided by the actual hardware of the physical machine 100.

The other physical machine 102 similarly includes a VMM 418 that provides the interface between the virtual machines 112, 114, 116 and the physical resources, including hardware 420, of the physical machine 102.

As further depicted in FIG. 4, the local placement controller 136 includes one or more CPUs 422 and memory 424. Also, a network interface 426 is provided in the placement controller 136 to allow communication between the placement controller 136 and the local network 130.

The local placement controller 136 also includes a VM layout selector 428 (to perform selection of a layout of the virtual machines mapped to physical machines within data center 1). Additionally, the local placement controller 136 includes a migration control module 430 to control migration of virtual machines from one physical machine to another physical machine (in accordance with the layout selected by the VM layout selector 428). In some implementations, the VM layout selector 428 and migration control module 430 are software modules executable on the CPU 422 of the local placement controller 136.

As noted above, in determining placement of virtual machines onto corresponding physical machines, the local placement controller 136 (more specifically the VM layout selector 428) takes into account various predefined criteria. One type of predefined criteria is related to loading of physical resources or machines. Since there are various different physical resources (e.g., CPU, memory, network interface, storage network, etc.), there are different loading criteria to consider. The different loading criteria thus include a loading criterion relating to the CPU usage, a loading criterion relating to memory usage, a loading criterion relating to network interface usage, a loading criterion relating to storage network usage, and any other loading criteria relating to usage of other resources.

Also, another loading criterion is an overloading criterion, which specifies that any particular physical machine should not be loaded by greater than some predefined threshold (e.g., 80%). If loading of a physical machine exceeds this predefined threshold, then migration of virtual machine(s) from the overloaded physical machine would be desirable.

As noted above, placement of virtual machines should satisfy a QoS goal of the system. This QoS may have been set by a user or by the system. One example QoS goal is the allocation of scheduling shares to each virtual machine within a physical machine. The VMM 416 or 418 according to some implementations includes a scheduler that schedules access to physical resources of the physical machine 100 or 102, where the scheduler in the VMM specifies the number of shares to allocate to each virtual machine.

Other example criteria that are considered by the VM layout selector 428 include cooling and power criteria. During operation, temperatures in physical machines can exceed a temperature threshold. If this occurs, then migration of virtual machines from the over-heated physical machines may be desirable. Cooling criteria can also specify cooling costs. In large data centers, for example, sophisticated cooling equipment is usually provided to cool physical machines. To reduce cooling costs, migration of virtual machines can be performed in a manner that allows some part of the cooling equipment to be turned off (or run in a lower power mode). In one example, virtual machines can be placed such that one or more physical machines can be turned off (or placed in a lower power state), such that corresponding cooling equipment can be shut off (or run in a lower power mode). The lower power state of a physical machine refers to any one of several possible power savings states of such machines, including sleep states, standby states, hibernation states, and so forth.

Power criteria are also considered by the VM layout selector 428. In addition to turning off (or placing into a lower power state) physical machines for the purpose of reducing cooling costs, such action can also be performed for the purpose of reducing power consumption of physical machines (for more efficient usage).

Both the cooling criteria and power criteria are considered consolidation criteria that favor migrating virtual machines onto fewer physical machines so that at least some of the physical machines can be turned off or otherwise placed into an idle state, for cost and power conservation. However, the cooling and power criteria are counter-balanced by some of the other factors, such as loading criteria that tend to favor distributing or spreading virtual machines across a larger number of physical machines.

Another criterion that can be considered by the VM layout selector 428 is the cost of performing migration of a virtual machine. Migrating a virtual machine from one physical machine to another physical machine is associated with a cost (in terms of the virtual machine being unavailable during migration and the bandwidth cost associated with moving data associated with the migrated virtual machine from one storage location to another storage location). If the VM layout selector 428 determines that the benefit of migrating a virtual machine is less than the cost of performing the migration, then the migration should not be performed.

The placement problem for identifying an optimal solution for placement of virtual machines on physical machines is a relatively complex problem. For a large system having many physical machines and virtual machines, the computation time for identifying the optimal placement of virtual machines can be very large. In accordance with an embodiment, a simulated annealing technique can be used to find an approximation of a globally optimal placement of virtual machines on physical machines. Generally, simulated annealing considers a current set (that represents some random placement of virtual machines on physical machines), and iteratively adjusts the current set until a better set can be identified. The simulated annealing algorithm attempts to replace a current solution with a random "nearby" solution. A new set that is more optimal than the current set is used as the new current set, and this process repeats until an approximated optimal solution is identified.

The simulated annealing algorithm performed by the VM layout selector 302 in the global placement controller 140 (FIG. 3) or the VM layout selector 428 in the local placement controller 136 (FIG. 4) can be based on a cost function (alternatively referred to as a "goodness function") that takes into account various constraints that represent the predefined criteria, e.g., criteria considered by the local placement controller or the regional environment effects considered by the global placement controller 140. The cost function is represented by some aggregation of terms, where each term is multiplied by a weight factor. Generally, the cost function has the form: $f=w_1 \times t_1 + w_2 \times t_2 + \ldots$, where the $t_i$ terms (i=1 to N) represent corresponding criteria (N total criteria, where N is an integer) to be considered, and the $w_i$ parameters represent weights to be applied to the terms. As examples, the $t_i$ terms can represent resource loading criteria (n terms to correspond to the n dimensions of resources), balancing criteria, cooling criteria, power criteria, regional environment effect factors, and so forth. The weight to be multiplied to each term generally represents the importance of the corresponding term in computing the goodness rating for a particular layout of virtual machines.

Figure 5:
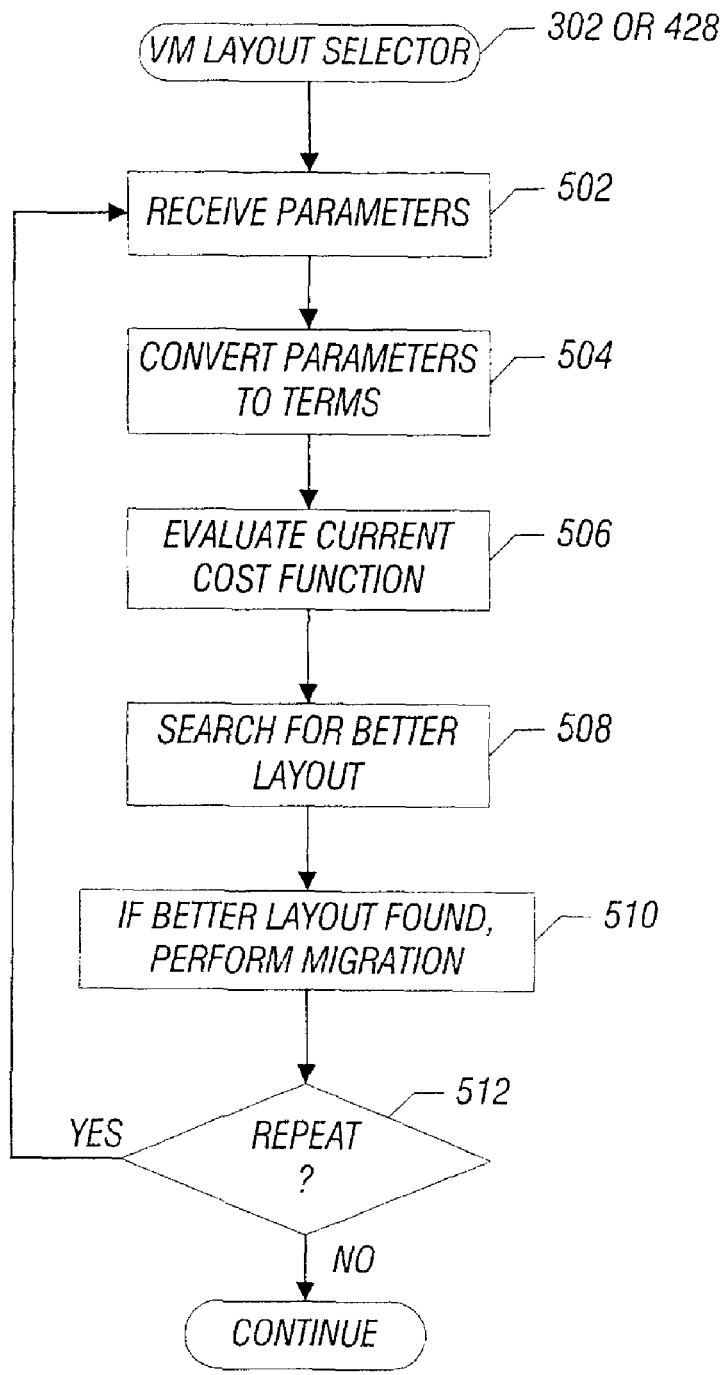
FIG. 5 is a flow diagram of a virtual machine layout selection process performed by the global or local placement controller, in accordance with an embodiment.

A flow diagram of a process performed by the VM layout selector 302 (FIG. 3) or the VM layout selector 428 (FIG. 4) is depicted in FIG. 5. The flow of FIG. 5 is performed repeatedly, such as at regular intervals or in response to predefined events. The VM layout selector receives (at 502) various parameters (e.g., parameters relating to regional environment effects and/or other criteria discussed above) relating to the terms to be considered for the cost function discussed above. The received parameters are converted (at 504) into the terms for use in the cost function.

The VM layout selector then evaluates (at 506) the cost function based on the terms derived from the measured parameters. The cost function produces an output that provides some indication of the performance of the particular placement of virtual machines on physical machines (such as in the form of a goodness rating or some other indicator). Next, the VM layout selector searches (at 508) for a better layout that represents another placement of virtual machines on physical machines.

If a better virtual machine layout is found in the search (at 508) for the better layout, the VM layout selector causes the migration control module (304 in FIG. 3 or 430 in FIG. 4) to perform (at 510) migration of one or more virtual machines according to the better virtual machine layout. As noted above, migrating a virtual machine refers to moving the state of the virtual machine from one physical machine to another physical machine. The state of the virtual machine includes content of registers of various hardware devices (e.g., CPUs, I/O devices, and so forth). Data in memory associated with the migrated virtual machine can also be transferred gradually (e.g., lazily) to the destination physical machine to which the virtual machine is migrated.

The VM layout selector determines (at 512) if the process at 504-510 is to be repeated. Repetition of the process at 504-510 can be performed periodically or in response to predefined events (e.g., detection of overheating, alarm indicating some fault has occurred, indication of overloading, and/or change in regional environment effects, etc.).

Instructions of software described above (including the VM layout selector 302 or 428, migration control module 304 or 430) are loaded for execution on a processor (such as one or more CPUs). The processor includes microprocessors, microcontrollers, processor modules or subsystems (including one or more microprocessors or microcontrollers), or other control or computing devices. As used here, a "processor" can refer to a single component or to plural components.

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of placing virtual machines on physical machines, comprising:
   receiving, by at least one controller, indicators related to regional environment effects, wherein the indicators are related to an availability of an alternative source of power, where the alternative source of power is at least one selected from among sunlight, a hydroelectric power source, and a wind power source; and
   selecting, by the at least one controller, at least one of the virtual machines to migrate from one or more first physical machines to one or more second physical machines in response to the availability of the alternative source of power as indicated in the received indicators.

2. The method of claim 1, wherein receiving the indicators comprises receiving the indicators from sources in different geographic regions that are coupled to a network.

3. The method of claim 2, wherein receiving the indicators from the sources comprises receiving the indicators from at least one of the following: news media sources; and power systems indicating availability of alternative sources of power.

4. The method of claim 1, further comprising migrating the at least one of the virtual machines from the one or more first physical machines to the one or more second physical machines, wherein the one or more first physical machines are part of a first geographic region, and the one or more second physical machines are in a second geographic region remotely located from the first geographic region, wherein the received indicators indicate that the alternative source of power is available in the second geographic region and the alternative source of power is unavailable in the first geographic region.

5. The method of claim 1, further comprising:
   migrating the at least one virtual machine from the one or more first physical machines to the one or more second physical machines, wherein the one or more first physical machines are part of a first data center, and wherein the one or more second physical machines are part of a second, distinct data center, wherein the received indicators indicate that the alternative source of power is available in the second data center and the alternative source of power is unavailable in the first data center.

6. The method of claim 1, wherein the at least one controller comprises a global placement controller, the one or more first physical machines are part of a first group, and the one or more second physical machines are part of a second, distinct group, the method further comprising:

selecting, by local placement controllers in the corresponding first and second groups, virtual machines to migrate among physical machines in the corresponding first and second groups, wherein the local placement controllers employ respective local criteria to migrate virtual machines among physical machines in the corresponding first and second groups.

7. The method of claim 6, wherein the first and second groups comprise one of separate geographic regions and distinct data centers.

8. The method of claim 6, wherein the local criteria are plural criteria selected from among a loading criterion that specifies a target loading level on a physical machine, and a balancing criterion that specifies balancing of loading across physical machines.

9. The method of claim 1, wherein selecting the at least one of the virtual machines to migrate is performed by a virtual machine layout selector that considers criteria including the regional environment effects.

10. The method of claim 1, further comprising providing information technology services, wherein the receiving and selecting are part of the information technology services.

11. An article comprising at least one computer-readable storage medium containing instructions that when executed cause a computer to:

receive information related to regional environment effects, wherein the received information includes availability of an alternative source of power, and availability of cooler weather in one region as compared to another region, where the alternative source of power is at least one selected from among sunlight, a hydroelectric power source, and a wind power source;

select at least one of the virtual machines to migrate from one or more first physical machines in a first group to one or more second physical machines in a second group, in response to the received information indicating availability of the alternative source of power and the availability of cooler weather.

12. The article of claim 11, wherein the first group comprises a first geographic region, and the second group comprises a second geographic region located remotely from the first geographic region, wherein the received indicators indicate that the alternative source of power is available in the second geographic region and the alternative source of power is unavailable in the first geographic region.

13. The article of claim 11, wherein the first group comprises a first data center, and the second group comprises a second, distinct data center, wherein the received indicators indicate that the alternative source of power is available in the second data center and the alternative source of power is unavailable in the first data center.

14. The article of claim 11, wherein the computer comprises a global placement controller to perform the receiving and selecting tasks, and wherein the global placement controller is part of a multi-tiered placement control system that further includes local placement controllers in the corresponding first and second groups to perform local placement of virtual machines within the corresponding first and second groups according to respective local criteria.

15. The article of claim 14, wherein the local criteria are plural criteria selected from among a loading criterion that specifies a target loading level on a physical machine, and a balancing criterion that specifies balancing of loading across physical machines.

16. A system comprising:

a global placement controller comprising:

a network interface to receive information related to regional environment effects, the received information including availability of an alternative source of power selected from among sunlight, a hydroelectric power source, and a wind power source; and a processor to:

in response to the received information indicating availability of the alternative source of power, select virtual machines to migrate from physical machines of a first group to physical machines of a second, distinct group; and control migration of the virtual machines from the physical machines of the first group to the physical machines of the second group.

17. The system of claim 16, further comprising local placement controllers in the corresponding first and second groups to control migration of virtual machines in the respective groups according to respective local criteria.

18. The system of claim 17, wherein the local criteria comprise distribution criteria to distribute virtual machines across physical machines of each group, and consolidation criteria to consolidate virtual machines onto physical machines of each group.

19. The system of claim 16, further comprising sources to communicate the information related to the regional effects to the global placement controller.

* * * * *